Figure 1:
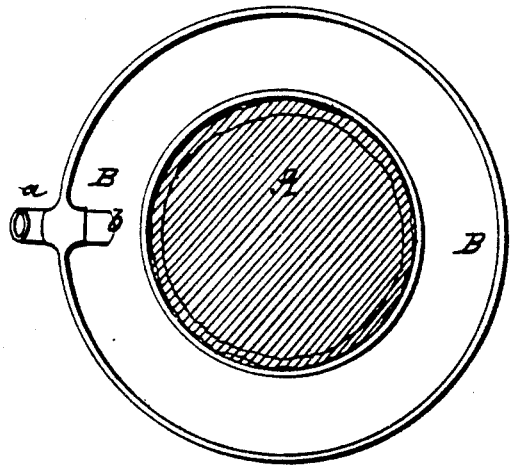
Figure 2:
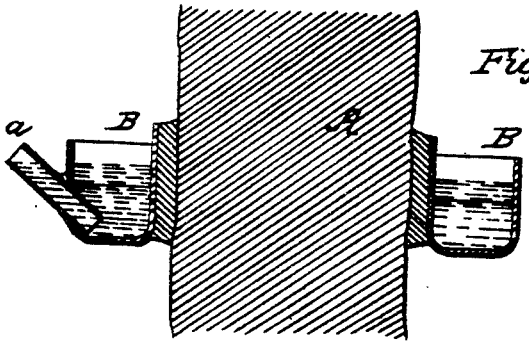

BEST AVAILABLE COPY
D. NEWHALL.
Tree Protector.
No. 42.
A. I. Patented April 24, 1841.
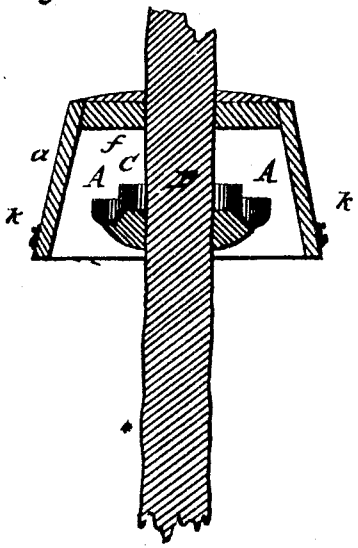
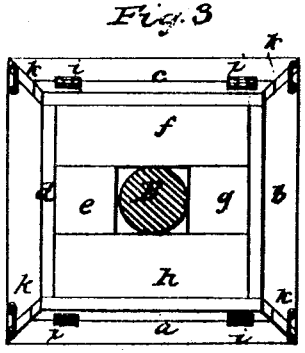
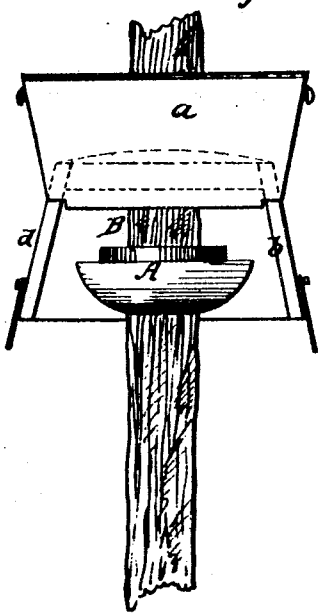

BEST AVAILABLE COPY

D. NEWHALL.

Tree Protector.

No. 42.

A. I. Patented April 24, 1841.